United States Patent
Yamane (10) Patent No.: US 9,729,737 B2
(45) Date of Patent: Aug. 8, 2017

(54) IMAGE READING APPARATUS AND COMPUTER-READABLE STORAGE MEDIUM

(71) Applicant: CASIO COMPUTER CO., LTD., Shibuya-ku, Tokyo (JP)

(72) Inventor: Kazuyasu Yamane, Ome (JP)

(73) Assignee: CASIO COMPUTER CO., LTD., Tokyo (JP)

(*) Notice: Subject to any disclaimer, the term of this patent is extended or adjusted under 35 U.S.C. 154(b) by 0 days.

(21) Appl. No.: 15/146,280

(22) Filed: May 4, 2016

(65) Prior Publication Data

US 2016/0248924 A1 Aug. 25, 2016

Related U.S. Application Data

(62) Division of application No. 13/912,959, filed on Jun. 7, 2013, now abandoned.

(30) Foreign Application Priority Data

Jun. 8, 2012 (JP) .................................. 2012-130791

(51) Int. Cl.
*H04N 1/00* (2006.01)
*H04N 1/21* (2006.01)
(Continued)

(52) U.S. Cl.
CPC ..... *H04N 1/00328* (2013.01); *H04N 1/00347* (2013.01); *H04N 1/00448* (2013.01);
(Continued)

(58) Field of Classification Search
CPC ........... H04N 1/00328; H04N 1/00347; H04N 1/00832; H04N 1/19594; H04N 1/2112;
(Continued)

(56) References Cited

U.S. PATENT DOCUMENTS 7,619,784 B1* 11/2009 O'Sullivan ........ G06K 9/00993
358/403
2013/0250379 A1* 9/2013 Rigazio .............. H04N 1/19594
358/538

FOREIGN PATENT DOCUMENTS

CN 101895789 A 11/2010
JP 2012065261 A 3/2012

OTHER PUBLICATIONS

Chinese Office Action (and English translation thereof) dated May 7, 2015, issued in counterpart Chinese Application No. 201310227350.7.

* cited by examiner

*Primary Examiner* — Quang N Vo
(74) *Attorney, Agent, or Firm* — Holtz, Holtz & Volek PC (57) ABSTRACT

An image reader includes a first judging section which judges whether a newly captured image is an image obtained by page-turning of a book to a destination position of the page; a temporary storage section which temporarily stores the newly captured image as a previous captured image when it is judges that the newly captured image is not an image obtained by page-turning to a destination position; a second judging section which, prior to temporarily storing the newly captured image as a previous captured image, judges whether, based on a latest image temporarily stored as a previous captured image and the newly captured image to be temporarily stored, the latest captured image and the newly captured image are an image of same pages; and a determining section which determines the latest captured image as a storage target when it is judged that the latest captured image and the newly captured image are not an image of a same page.

6 Claims, 9 Drawing Sheets

(51) Int. Cl.
*H04N 1/195* (2006.01)
*H04N 1/32* (2006.01)

(52) U.S. Cl.
CPC ..... *H04N 1/00832* (2013.01); *H04N 1/19594* (2013.01); *H04N 1/2112* (2013.01); *H04N 1/3248* (2013.01); *H04N 2201/0081* (2013.01); *H04N 2201/0087* (2013.01); *H04N 2201/0089* (2013.01); *H04N 2201/3288* (2013.01); *H04N 2201/3295* (2013.01)

(58) Field of Classification Search
CPC ......... H04N 1/3248; H04N 2201/0081; H04N 2201/0087; H04N 2201/0089; H04N 2201/3288; H04N 2201/3295
USPC ............... 358/448; 345/8, 633, 156; 353/28; 359/13
See application file for complete search history.

IMAGE READING APPARATUS AND COMPUTER-READABLE STORAGE MEDIUM

CROSS-REFERENCE TO RELATED APPLICATION

This application is a Divisional application of U.S. Ser. No. 13/912,959, filed Jun. 7, 2013, which is based upon and claims the benefit of priority from the prior Japanese Patent Application No. 2012-130791, filed Jun. 8, 2012, the entire contents of both of which are incorporated herein by reference.

BACKGROUND OF THE INVENTION

1. Field of the Invention

The present invention relates to an image reading apparatus including an imaging section which images information described in a read target medium (for example, a notebook or a book) consisting of a plurality of pages, and a computer-readable storage medium.

2. Description of the Related Art

In general, an image reading apparatus for reading information described in a read target medium such as a notebook reads the read target medium as image data by scanning it by a scanner, or reads the read target medium as a captured image by imaging it by a digital camera.

Here, in the case where reading is performed with a scanner, the read target medium is required to be not in a booklet form but a single sheet (in a sheet state). Also, in the case where reading is performed with a digital camera, the read target medium may be in a booklet form, but the user is required to perform imaging while turning over the pages one by one.

As this type of conventional technology for imaging while turning pages, a technique is known in which a character (a page number) in an image captured by an imaging section is recognized after page-turning is detected, and the captured image is actually recorded on condition that an already stored image and the captured image have different page numbers (refer to Japanese Patent Application Laid-Open (Kokai) Publication No. 2012-065261).

In the technology described above, the end of page-turning is detected based on whether a horizontal line in an image (an edge side portion of a page) has descended to be stabilized while the user is holding a book and flipping through the pages by using gravity.

However, in the above-described technology disclosed in Japanese Patent Application Laid-Open (Kokai) Publication No. 2012-065261, if an already stored image and a currently captured image have the same page number, the captured image is not actually recorded. For example, in a case where pages of a notebook are imaged while a character, a graph, or the like is being added to the notebook, even when a new character or graph is added, the page number is detected as being the same between an already stored image and a currently captured image. Therefore, the currently captured image is disregarded and not actually recorded.

This problem is not limited to the case where the read target medium is a notebook, and a similar problem occurs when pages of a book are imaged while information is being added to the book in handwriting.

SUMMARY OF THE INVENTION

The present invention is to appropriately store a captured image for each page simply by turning a page without performing an imaging instruction operation for each page or adjusting a range that can be imaged when a read target medium consisting of a plurality of pages is imaged.

In accordance with one aspect of the present invention, there is provided an image reading apparatus including an imaging section which images information described in a read target medium consisting of a plurality of pages, comprising: a temporary storage section which stores a newly captured image as a current captured image, and stores an image that has been stored as a current captured image as a previous captured image each time the imaging section images the read target medium; a judging section which judges whether a current state is a page-turning state by analyzing the current captured image stored in the temporary storage section; and a determining section which determines the previous captured image stored in the temporary storage section as a storage target when the judging section judges that the current state is the page-turning state.

In accordance with another aspect of the present invention, there is provided a non-transitory computer-readable storage medium having stored thereon a program that is executable by a computer, the program being executable by the computer to perform functions comprising: processing for judging, in a state where a newly captured image is temporarily stored as a current captured image and an image that has been stored as a current captured image is temporarily stored as a previous image each time a read target medium consisting of a plurality of pages is imaged by an imaging section, whether a current state is a page-turning state by analyzing the temporarily-stored current captured image; and processing for determining the temporarily-stored previous captured image as a storage target when the current state is judged to be the page-turning state.

According to the present invention, in a case where a read target medium consisting of a plurality of pages is imaged, a captured image can be appropriately stored for each page simply by turning a page without performing an imaging instruction operation for each page or adjusting a range that can be imaged, whereby convenience and reliability are enhanced.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

DETAILED DESCRIPTION OF THE PREFERRED EMBODIMENTS

Embodiments of the present invention are described in detail below with reference to the drawings.

First Embodiment

First, a first embodiment of the present invention is described with reference to FIG. 1 to FIG. 7J.

Figure 1:
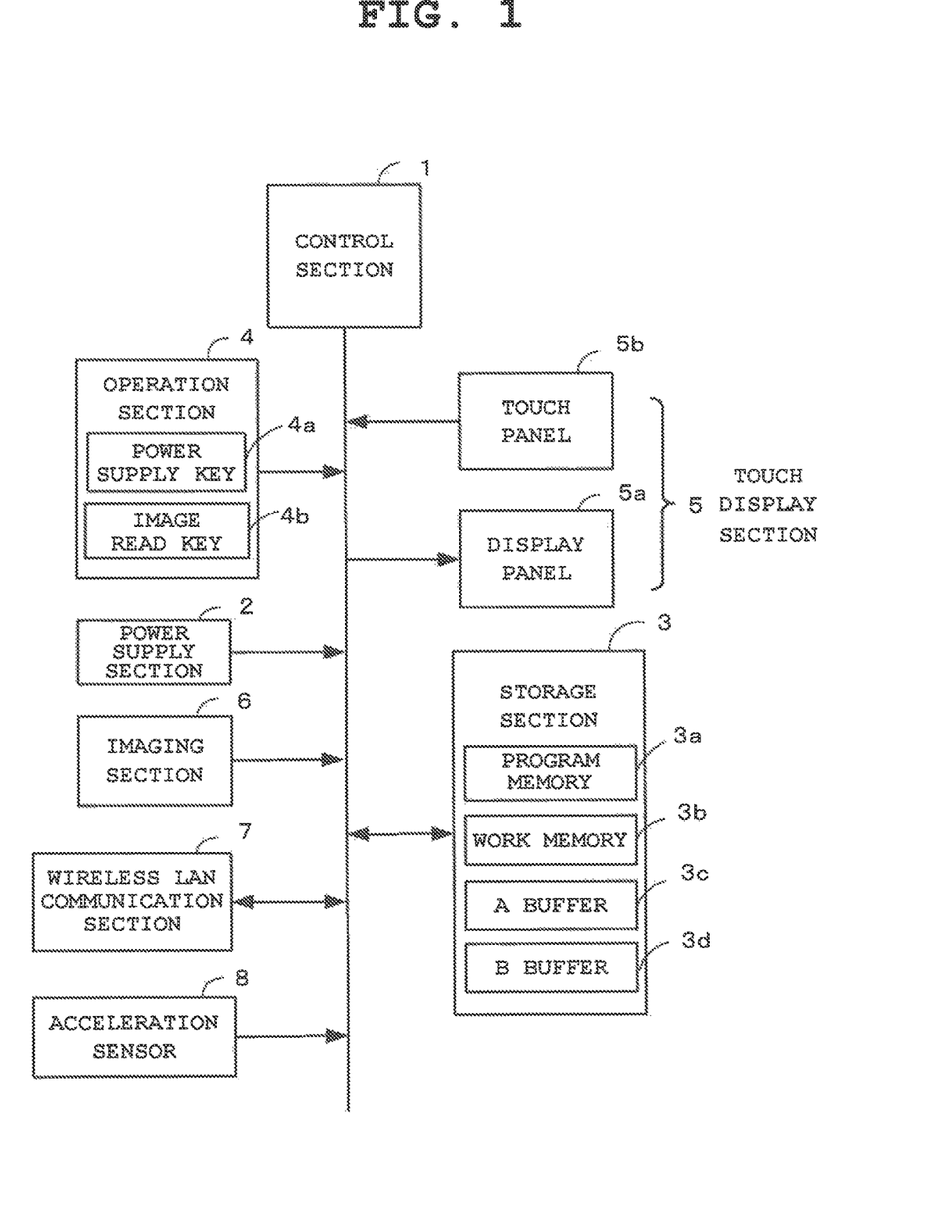
FIG. 1 is a block diagram depicting basic components of a tablet terminal device 11 including an imaging function (a digital camera), in which the present invention has been applied as an image reading apparatus.

The present embodiment is an example in which the present invention has been applied as an image reading apparatus to a tablet terminal device including an imaging function (a digital camera). FIG. 1 is a block diagram depicting basic components of the camera-equipped tablet terminal device.

For example, the tablet terminal device is a portable information terminal device of an A5 size as a whole, and is configured to have a control section 1 as a core and include basic functions, such as a touch input function and a wireless communication function, and an image reading function (a notebook reading function) for reading information (such as a character or a graph) described in a read target medium (a notebook placed in an opened state) placed near the tablet terminal device by imaging the read target medium, which will be described further below in detail.

The control section 1 operates with power supply from a power supply section (a secondary battery) 2, and controls the entire operation of the tablet terminal device according to various programs in a storage section 3. This control section 1 is provided with a CPU (Central Processing Unit) and a memory not shown.

The storage section 3 is configured to have, for example, a ROM (Read-Only Memory) and a flash memory, and includes a program memory 3a having stored therein programs and various applications for achieving the present embodiment according to an operation procedure depicted in FIG. 5 and FIG. 6, which will be described further below, a work memory 3b that temporarily stores various information (for example, a flag) required for the operation of the tablet terminal device, an A buffer 3c and a B buffer 3d, and the like which will be described further below.

The storage section 3 may be configured to include a removable portable memory (recording medium) such as an SD (Secure Digital) card or an IC (Integrated Circuit) card, or may be configured to include, although not shown, a storage area on a predetermined server device side in a case where the tablet terminal device is connected to a network via a communication function.

An operation section 4 in FIG. 1 includes a power supply key 4a to turn the power supply ON/OFF, an image read key 4b to start and end the image reading function (notebook reading function), and the like as push keys. The control section 1 performs processing according to an input operation signal outputted from the operation section 4 in response to the operation of an operation key.

A touch display section 5 in FIG. 1 is configured to have a touch panel 5b laminated on a display panel 5a. The display panel 5a is a high-definition liquid-crystal display or an organic EL (Electro Luminescence) display having a screen where the aspect ratio differs (for example, 4:3 [width to height]).

The touch panel 5b constitutes a touch screen where a point touched with a finger of the user is detected and its coordinate data is inputted. For example, a capacitive type or a resistive film type is adopted herein. However, any other type may be adopted.

An imaging section 6 in FIG. 1 provides the image reading function (notebook reading function). This imaging section 6 is a camera section that can image a subject with high definition by forming a subject image from an optical lens at an imaging element such as a CCD (Charge Coupled Device) or a CMOS (Complementary Metal Oxide Semiconductor) not shown, and includes a taking lens, an image pickup device, various sensors, an analog processing section, and a digital processing section.

For example, the imaging section 6 can perform continuous imaging (high-speed imaging) at a frame rate of 15 frames per second (15 fps). When the image reading function (notebook reading function) is running, the control section 1 controls such that a newly captured image for one frame is temporarily stored in the A buffer 3c as a current captured image, and a captured image temporarily stored up to this point in the A buffer 3c to be transferred to and temporarily stored in the B buffer 3d as a previous captured image.

A wireless LAN (Local Area Network) communication section 7 in FIG. 1 is a wireless communication module capable of high-speed large-capacity communication and capable of being connected to the Internet via a nearby wireless LAN router (not shown).

An acceleration sensor 8 in FIG. 1 is an acceleration sensor of a triaxial type, and outputs acceleration components in three axes directions (X, Y, and Z directions) orthogonal to each other, or in other words, voltage values in proportion to the magnitudes of acceleration applied to three axes. Also, this acceleration sensor 8 is an orientation sensor for detecting the orientation (tilting) of a housing (the main body of the device) based on detection values of the voltage values.

When the image reading function (notebook reading function) is running, the control section 1 refers to detection results from the acceleration sensor 8 and judges whether the orientation of the housing (the main body of the device) is suitable for the image reading function (notebook reading function).

Figure 2A:
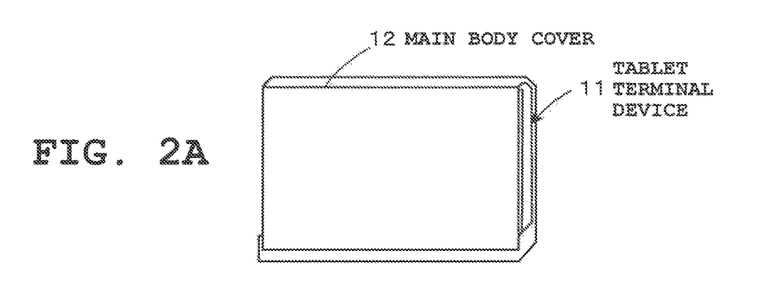
FIG. 2A is a diagram depicting the tablet terminal device 11 protected with a main body cover 12.
Figure 2B:
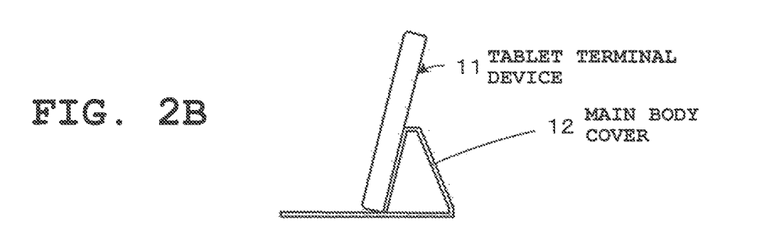
FIG. 2B is a diagram depicting the tablet terminal device 11 standing by using the main body cover 12.

FIG. 2A is a diagram depicting the tablet terminal device 11 protected with a main body cover 12. FIG. 2B is a diagram depicting the tablet terminal device 11 diagonally standing by using the main body cover 12.

That is, the housing of the tablet terminal device 11 forms a thin rectangular parallelepiped as a whole. FIG. 2B, which depicts the state in which the housing is in a landscape orientation with its short side direction slightly laid down (inclined toward the rear side), is a side view of the standing state viewed from one side direction. The main body cover 12 is structured to be foldable at a predetermined position (for example, two positions).

That is, as depicted in FIG. 2B, the main body cover 12 is structured to be capable of being folded at two positions, or in other words, the top portion and the back center portion, and supporting the standing tablet terminal device 11 from behind by being folded at these positions.

Figure 2C:
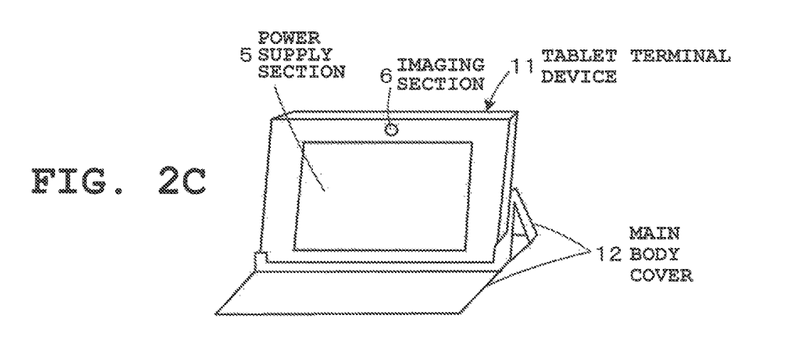
FIG. 2C is a diagram depicting the standing tablet terminal device 11 viewed from the front direction.

FIG. 2C is a schematic perspective view of the standing tablet terminal device 11 when viewed from the front direction, in which the tablet terminal device 11 is in the landscape orientation with its short side direction slightly laid down, as depicted in FIG. 2B.

As depicted in FIG. 2C, with the tablet terminal device 11 standing in the landscape orientation, the touch display section 5 is placed in the substantially entire area of the front side of the housing.

On the center of the upper end of the front side of the housing, the imaging section (the digital camera) 6 is placed. Although not shown, a mark, a line, or the like for guiding the placement position of a read target medium may be printed on part of the main body cover 12.

Figure 3:
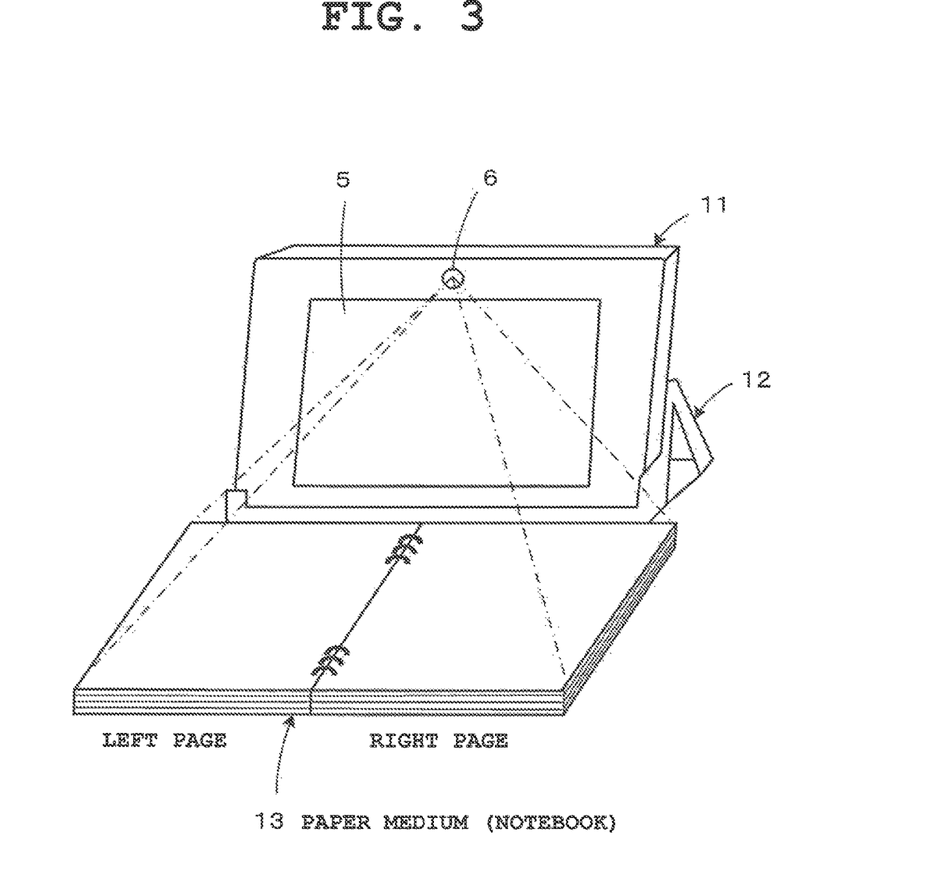
FIG. 3 is a diagram for describing a relation between the viewing angle of an imaging section 6 and a read target medium (a notebook) 13 when the read target medium 13 to be read is placed anterior and inferior to the standing tablet terminal device 11 and imaged.

FIG. 3 is a diagram for describing a relation between the viewing angle of the imaging section 6 and a read target medium (a notebook) 13 when the read target medium 13 as a read target is placed anterior and inferior to (near the lower side portion of) the standing tablet terminal device 11 which is in the landscape orientation with its short side direction slightly laid down, and then imaged.

Although depending on the size of the read target medium 13, the viewing angle of the imaging section 6 takes an area corresponding to the size of the read target medium 13 as a range that can be imaged. When the opened read target medium 13 is placed anterior and inferior to the tablet terminal device 11, left and right pages in the opened state are the range that can be imaged. The imaging section 6 can adjust the viewing angle, exposure, white balance, and the like according to the type (such as size, paper quality, or color) of the read target medium 13.

Figure 4A:
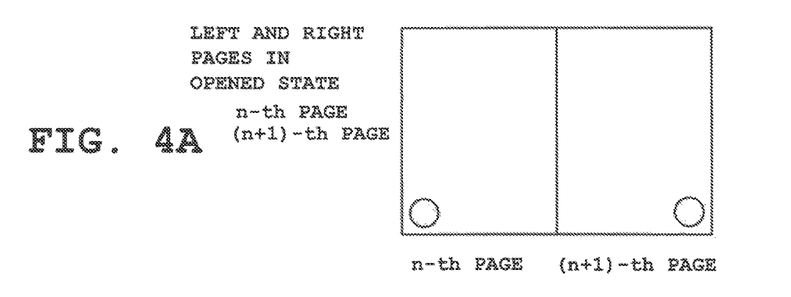
FIG. 4A to FIG. 4C are diagrams for describing marks M added to predetermined areas on left and right pages of the opened read target medium 13.
Figure 4B:
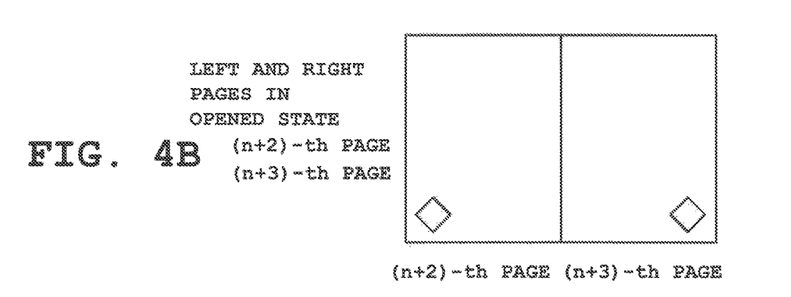
Figure 4C:
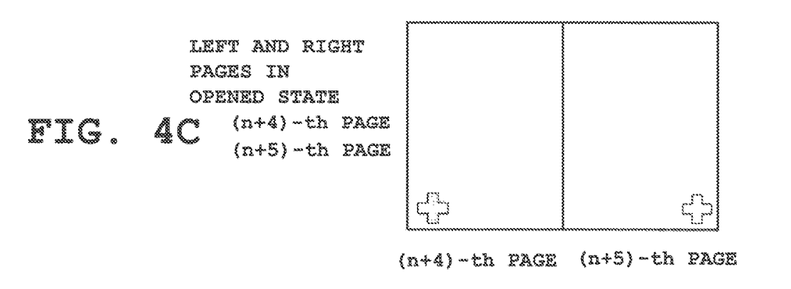

FIG. 4A to FIG. 4C are diagrams for describing marks M added to predetermined areas on left and right pages of the opened read target medium (the notebook) 13.

These predetermined marks M are added to predetermined areas of the respective pages (lower corners of the pages) constituting the read target medium 13.

That is, the marks M added to the lower left corner of the left page and the lower right corner of the right page in the opened state of the read target medium 13 are identical to each other, but the marks M added to other left and right pages are different from those described above.

For example, circular marks M are added to the left and right pages in the opened state depicted in FIG. 4A (an n-th page and an (n+1)-th page). Also, as depicted in FIG. 4B, diamond marks Mare added to the next left and right pages (an (n+2)-th page and an (n+3)-th page). Moreover, as depicted in FIG. 4C, cross marks M are added to the further next left and right pages (an (n+4)-th page and an (n+5)-th page).

Similarly, circular, diamond, and cross marks M are cyclically added to the following left and right pages in the opened state. That is, diamond marks are added to the left and right pages next to those with circular marks, cross marks are added to the left and right pages next to those with the diamond marks, and circular marks are added to the left and right pages next to those with the cross marks.

To add the marks M to the read target medium 13, the marks M may be printed in advance, or a user may attach labels with marks to the read target medium 13 as required.

While the marks M are represented in the drawings as being large compared with the read target medium 13 so that the marks M are clearly depicted, the marks M in practical use are of a small size so as to be inconspicuous.

As such, in the state where the marks M have been added to the respective pages of the read target medium 13, when left and right pages are imaged such that these pages in the opened state of the read target medium are included in the imaging range of the imaging section 6, the control section 1 recognizes each mark M added to each page in the opened state by analyzing the current captured image, and judges whether the current state is a page-turning state (during page-turning) based on relevance of each of the recognized marks M.

That is, if the marks M on left and right pages are of the same type and shape, the control section 1 judges that the current state is not the page-turning state. If the marks M on left and right pages are of different types or of different shapes even of the same type, the control section 1 judges that the current state is the page-turning state.

That is, by turning a page, the mark on that page may seem to be deformed or may be hidden, or a mark on a subsequent page may appear. As such, by using the fact that page-turning causes the mark to be viewed differently or causes a mark on a subsequent page to appear, the control section 1 judges whether page-turning is being performed by detecting the state of the marks.

For example, by turning a page, even a circular mark on that page may seem to be deformed or partially chipped. In this case, the control section 1 judges that the marks are not of the same shape even if the marks are of the same type. Also, if the control section 1 suddenly becomes unable to recognize any mark M or a mark M partially overlaps a mark M on a subsequent page, the control section 1 judges that the marks M are not of the same shape.

In the first embodiment, the control section 1 judges whether page-turning is being performed depending on whether the respective marks M on left and right pages in the opened state are of the same type and shape. Alternatively, the control section 1 may judge whether page-turning is being performed only based on the type of the marks M, or in other words, depending on whether the marks M on left and right pages in the opened state are of the same type.

As a result, when judged that page-turning is being performed, the control section 1 judges the previous captured image temporarily stored in the B buffer 3d as an image to be stored, and causes the previous captured image to be recorded and stored in the SD card of the storage section 3.

Next, the operation concept of the tablet terminal device 11 in the first embodiment is described with reference to flowcharts depicted in FIG. 5 and FIG. 6.

Here, each function described in these flowcharts is stored in the form of readable program code, and operations according to the program code are sequentially performed. Also, operations according to the program code transmitted via a transmission medium such as a network can be sequentially performed.

The same goes for other embodiments, which will be described further below. An operation unique to the present embodiment can be performed by using a program/data externally supplied via not only a recording medium but also a transmission medium.

Figure 5:
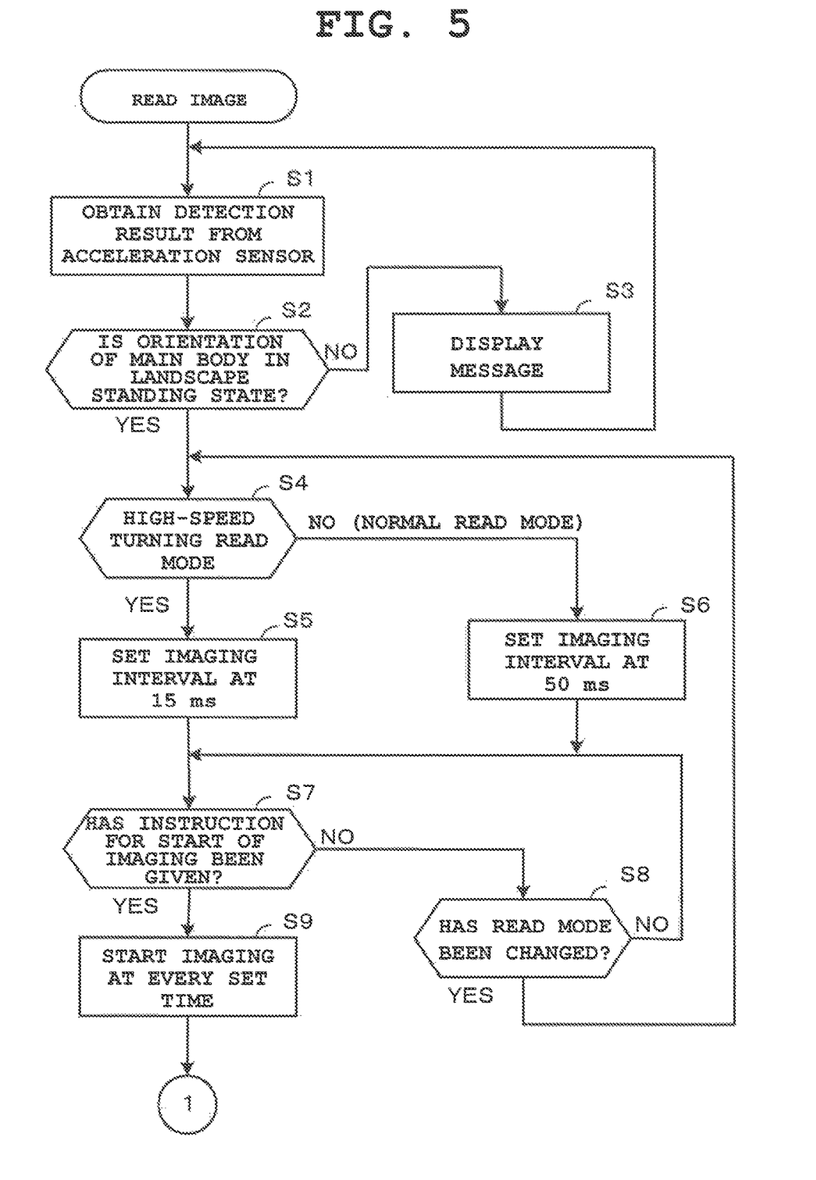
FIG. 5 is a flowchart of an operation that is started when an image reading function (a notebook reading function) is specified by an image read key 4b.
Figure 6:
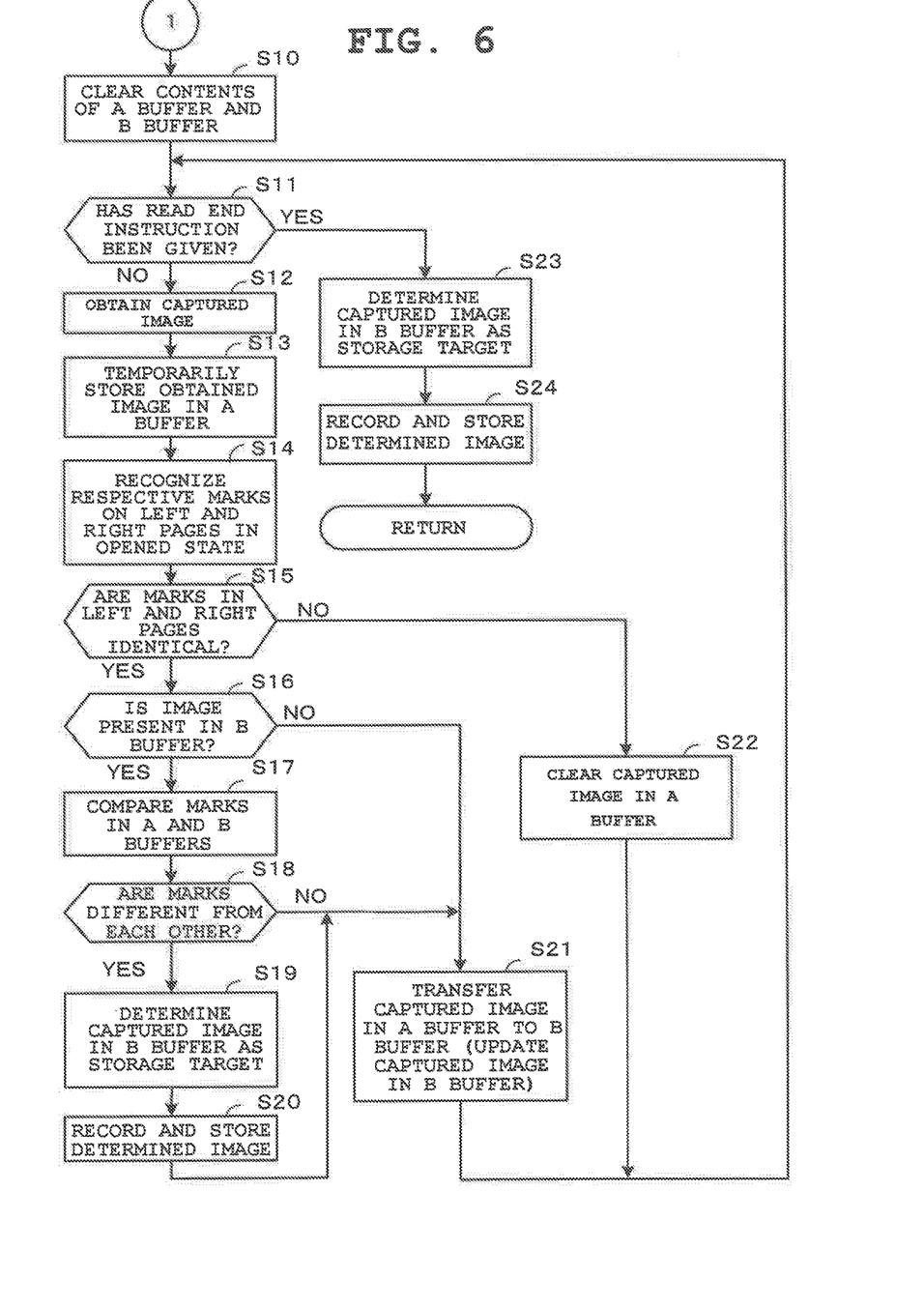
FIG. 6 is a flowchart of an operation following the operation of FIG. 5.

FIG. 5 and FIG. 6 are flowcharts outlining the operation of a characteristic portion of the present embodiment from among all of the operations of the tablet terminal device 11. After exiting the flows of FIG. 5 and FIG. 6, the control section 1 returns to the main flow (not shown) of the entire operation.

FIG. 5 and FIG. 6 are flowcharts of the operation that is started when the image reading function (notebook reading function) is specified by the image read key 4b.

The operation of the image reading function (notebook reading function) is specifically described with reference to FIG. 7A to FIG. 7J.

FIG. 7A to FIG. 7J are diagrams exemplarily depicting the contents of the A buffer 3c and the B buffer 3d making transitions with time, which are images when viewed from the direction of the user.

After starting the image reading function (the notebook reading function) by operating the image read key 4b, the user sequentially turns the pages of a notebook while adding lesson content or the like to the notebook according to the progress of the lesson.

When the image reading function is activated, the control section 1 first starts the acceleration sensor 8, obtains a detection result therefrom (Step S1 of FIG. 5), and judges whether the orientation of the housing is suitable for image reading, that is, whether the tablet terminal device 11 is in a standing state (a state suitable for image reading) in which the tablet terminal device 11 is in a landscape orientation with its short side direction slightly laid down (Step S2).

When the state is not the state suitable for image reading (NO at Step S2), the control section 1 causes the touch display section 5 to display a message for notifying the user that the orientation of the housing should be changed to be in the state suitable for image reading (Step S3), and then returns to Step S1. This operation is repeated until the orientation is changed.

When the orientation suitable for image reading is detected (YES at Step S2), the control section 1 judges whether the current mode is a high-speed turning read mode (a high-speed read mode) (Step S4).

Here, the high-speed turning read mode is a read mode that is used when so-called flipping is performed, or in other words, when a plurality of pages are consecutively turned at high speed (for example, one page per second) to read images at high speed and collectively store them. If the current mode is not the high-speed turning read mode, the control section 1 judges that the current mode is a normal read mode other than the high-speed read mode.

When the current mode is the normal read mode (NO at Step S4), the control section 1 sets a slow imaging interval (for example, 50 ms) (Step S6). When the current mode is the high-speed turning read mode (YES at Step S4), the control section 1 sets a fast imaging interval (for example, 15 ms) (Step S5).

Then, the control section 1 judges whether an operation for instructing the start of imaging has been performed (Step S7), and judges whether an operation for instructing the change of the read mode has been performed (Step S8).

When judged that an operation for instructing the change of the read mode has been performed (YES at Step S8), the control section 1 returns to Step S4, and performs processing for resetting the imaging interval according to the changed read mode (Step S5 or Step S6).

When judged that an operation for instructing the start of imaging has been performed (YES at Step S7), the control section 1 starts imaging by the imaging section 6 at every set time described above (Step S9).

Then, the control section 1 proceeds to the flow of FIG. 6, and after performing initialization 0 processing for clearing the contents of the A buffer 3c and the B buffer 3d (Step S10), judges whether an operation for instructing the end of the image reading function (notebook reading function) has been performed (Step S11).

When judged that an read end operation has not been performed (NO at Step S11), the control section 1 obtains a captured image for one frame from the imaging section 6 imaging at every set time described above (Step S12), and temporarily stores the obtained image in the A buffer 3c as a current captured image (Step S13).

Then, by analyzing the current captured image, the control section 1 recognizes the respective marks M added on predetermined areas of the left and right pages (Step S14), and judges whether the marks M on the left and right pages are of the same type and shape (Step S15).

That is, the control section 1 judges whether the marks are of the same type (for example, circular, diamond, or cross marks) and also judges whether the marks M of the same type are of the same shape.

At the initial stage of the start of the reading, the control section 1 detects that the marks M on the left and right pages are of the same type and shape (YES at Step S15). Therefore, the control section 1 judges that no page-turning is being performed, and proceeds to the next Step S16 where the control section 1 judges whether a captured image has been temporarily stored in the B buffer 3d. However, if it is immediately after the initialization processing described above, the contents of the B buffer 3d have been cleared (NO at Step S16), and therefore the control section 1 proceeds to the next Step S21.

Figure 7A:
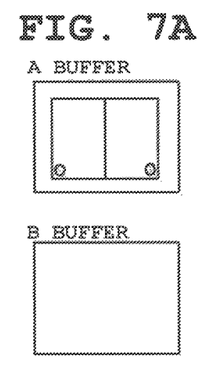
FIG. 7A to FIG. 7J are diagrams exemplarily depicting the contents of an A buffer 3c and a B buffer 3d making transitions with time.

For example, in the case of FIG. 7A, although the current captured image has been stored in the A buffer 3c, no captured image has been stored in the B buffer 3d. Therefore, the control section 1 detects this state, and proceeds to the next Step S21.

Figure 7B:
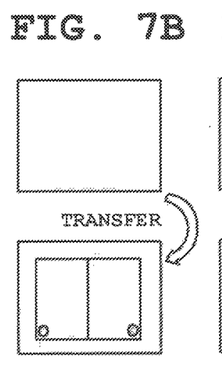

At Step S21, the control section 1 performs processing for updating the contents of the B buffer 3d by transferring the contents of the A buffer 3c to the B buffer 3d. FIG. 7B depicts the state immediately after the control section 1 transfers the captured image in the A buffer 3c to the B buffer 3d.

Then, the control section 1 returns to Step S11, obtains a captured image for one frame from the imaging section 6 imaging at every set time (Step S12), and temporarily stores the obtained image in the A buffer 3c as a current captured image (Step S13).

Figure 7C:
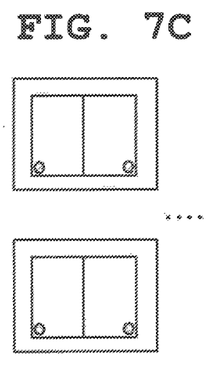

FIG. 7C depicts the contents of the A buffer 3c and the B buffer 3d in this case.

Here, on condition that the marks M on the left and right pages in the current captured image are of the same type and shape (YES at Step S15) and an image has been stored in the B buffer 3d (YES at Step S16), the control section 1 compares the marks M of the image in the A buffer 3c (the current captured image) and the image in the B buffer 3d (the previous captured image) with each other (Step S17) to judge whether the marks M are different from each other (Step S18).

In FIG. 7C, since the marks M are identical to each other (NO at Step S18), the control section 1 performs processing for updating the contents of the B buffer 3d by transferring the contents of the A buffer 3c to the B buffer 3d (Step S21), and then returns to Step S11.

Figure 7D:
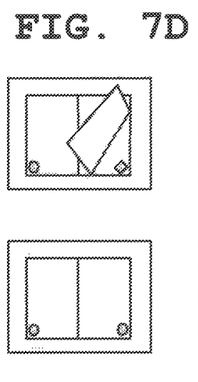

Similarly, the control section 1 obtains a captured image for one frame from the imaging section 6 (Step S12), temporarily stores the obtained image in the A buffer 3c as a current captured image (Step S13), and judges whether the marks M on the left and right pages in the current captured image are of the same type and shape (Steps S14 and S15). In this case, if the marks M on the left and right pages are of different types as depicted in FIG. 7D (NO at Step S18), the control section 1 judges that page-turning is being performed.

Figure 7E:
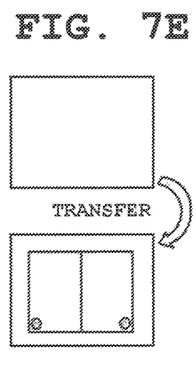

As such, when judged that page-turning is being performed, the control section 1 proceeds to the next Step S22, and clears the contents of the A buffer 3c to disregard the image (the current captured image) in the A buffer 3c. FIG. 7E depicts the case in which the contents of the A buffer 3c have been cleared.

Then, the control section 1 returns to Step S11, obtains a captured image for one frame from the imaging section 6 (Step S12) and temporarily stores the obtained image in the A buffer 3c as a current captured image (Step S13), as described above.

Figure 7F:
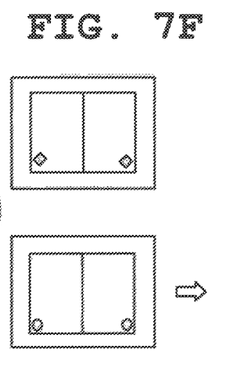

FIG. 7F depicts the contents of the A buffer 3c and the B buffer 3d in this case. In this case, as a result of comparing the marks M between the image in the A buffer 3c (the current captured image) and the image in the B buffer 3d (the previous captured image), the marks Mare different from each other (YES at Step S18). Therefore, the control section 1 determines the image in the B buffer 3d (the previous captured image) as a storage target (Step S19), and records and stores the determined image in the SD card of the storage section 3 (Step S20).

Figure 7G:
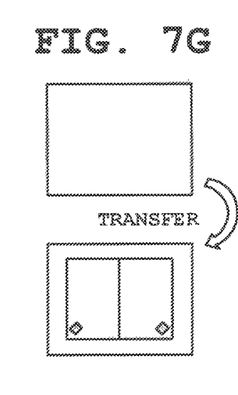

Then, the control section 1 proceeds to the next Step S21, and performs processing for updating the contents of the B buffer 3d by transferring the contents of the A buffer 3c to the B buffer 3d. FIG. 7G depicts the state in this case.

Figure 7H:
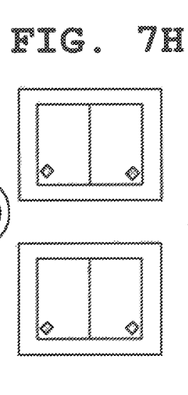

FIG. 7H depicts the case in which the marks M of the current captured image stored in the A buffer 3c are identical to the marks M of the previous captured image stored in the B buffer 3d, as in the case of FIG. 7C.

Figure 7I:
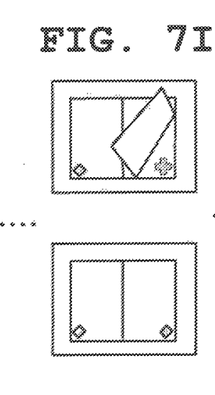

FIG. 7I depicts the case in which the marks M on the left and right pages in the current captured image are different from each other and the control section 1 judges that page-turning is being performed, as in the case of FIG. 7D.

Thereafter, if page-turning is not detected by the operation similar to that described above, the control section 1 updates the contents of the B buffer 3d. If page-turning is detected, the control section 1 determines the image in the B buffer 3d (the previous captured image) as a storage target, and records and stores the determined image in the SD card of the storage section 3.

Figure 7J:
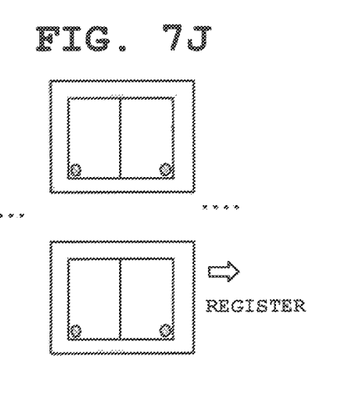

When an operation for instructing the end of the image reading function (the notebook reading function) is performed after the operation described above (YES at Step S11), the control section 1 determines the image in the B buffer 3d (the previous captured image) as a storage target (Step S23), and records and stores the determined image in the SD card of the storage section 3 (Step S24). Then, the control section 1 exits the flows of FIG. 5 and FIG. 6. FIG. 7J depicts the case in which an operation for ending image reading has been performed.

As described above, in the first embodiment, while performing an operation for storing a new captured image as a current captured image every time the imaging section 6 images the read target medium in the A buffer 3c and an operation for storing an image stored so far in the A buffer 3c as a current captured image in the B buffer 3d as a previous captured image, the control section 1 judges whether the current state is a page-turning state by analyzing the current captured image. If the current state is a page-turning state, the control section 1 determines the previous captured image stored in the B buffer 3d as a storage target. Therefore, in a case where a read target medium consisting of a plurality of pages is imaged, a captured image for each page can be appropriately stored simply by turning pages without performing an imaging instruction operation for each page or adjusting a range that can be imaged, whereby convenience and reliability are enhanced.

Also, when the read target medium 13 to be read is a notebook, the previous captured image contains all contents written in the notebook immediately before page-turning, and an image during writing in a page is not stored. Therefore, a captured image stored for each page is always appropriate.

Moreover, the stored image is an image immediately before page-turning. That is, even if fingers for turning the page is captured in the image when the user stops writing in the notebook and takes off the hand from the notebook to proceed to a page-turning operation, the hand holding a writing instrument in a writing state is not captured in the image.

Furthermore, the control section 1 recognizes the marks on the respective pages of the read target medium 13, and judges whether the current state is the page-turning state based on the mark recognition result. Therefore, the decision regarding page-turning can be made easily and appropriately, and trouble due to an error in judgment regarding page-turning can be prevented.

Still further, with information on two pages in the opened read target medium 13 being included, when the marks added to the respective pages in the opened state are recognized by analyzing the current captured image, the control section 1 judges whether the current state is the page-turning state based on relevance between the recognized marks (whether the marks are identical to each other). Therefore, page-turning can be appropriately judged based on relevance between the marks.

Yet still further, if relevance between the marks added to the respective pages in the opened state indicates that the marks are identical to each other (for example, if the marks are of the same type and shape), the control section 1 judges that the current state is not the page-turning state. If the marks are different from each other, the control section 1 judges that the current state is the page-turning state. Therefore, page-turning can be appropriately judged based on whether the marks are identical to each other.

Yet still further, when judged that the current state is the page-turning state, the control section 1 deletes the current captured image stored in the A buffer 3c. Therefore, an image captured during page-turning (an image not suitable for being stored) is reliably prevented from being transferred from the A buffer 3c to the B buffer 3d for storage, and only an appropriate image captured immediately before page-turning is stored.

Yet still further, in response to the image read end operation, the control section 1 determines the previous captured image in the B buffer 3d as a storage target. Therefore, pages can be stored up to the last written page of the notebook.

Yet still further, when the orientation of the main body of the device detected by the acceleration sensor 8 is a predetermined orientation, imaging by the imaging section 6 is performed. Therefore, imaging can be performed with the viewing angle, focus, exposure, and the like determined according to the orientation. Thus, the viewing angle, focus, exposure, and the like are not required to be adjusted.

Yet still further, as the orientation of the main body of the device, when the tablet terminal device 11 is in a landscape orientation and in a standing state with its short side direction slightly laid down, the imaging section 6 images the read target medium 13 placed near the lower side portion of (anterior and inferior to) the tablet terminal device 11.

Therefore, the read target medium 13 can be imaged always from above, which is suitable for imaging while writing in the notebook.

Yet still further, a selection can be freely made between the high-speed turning read mode for so-called flipping and the normal read mode other than high-speed turning, and imaging timing by the imaging section 6 is controlled so that the imaging interval complies with the read mode. Therefore, image reading according to a selected mode can be performed, whereby convenience is enhanced.

In the first embodiment described above, although the marks Mare of the same type and shape as relevance of the marks M in the current captured image, the control section 1 may judge whether the marks M are of the same type as relevance of the marks M, as described above.

Also, the control section 1 may judge whether the current state is the page-turning state based on whether the marks M of the same type are of the same mark size or the same placement position. For example, the control section 1 may judge based on a combination of the mark shape and the mark placement position.

Moreover, although the circular, diamond, and cross marks are exemplarily described as types of the marks M in the first embodiment described above, the present invention is not limited thereto, and any other type can be used. The marks M are not restricted to graphic forms or signs, but may be characters or numerals and, as a matter of course, page numbers (sequential numbers) printed on a read target medium.

Furthermore, although the control section 1 stores a captured image for one frame in sequence in the A buffer 3c and the B buffer 3c in the first embodiment described above, the control section 1 may temporarily store a plurality of captured images for a plurality of successive frames. In this case, the control section 1 may specify a captured image at an intermediate point from among the captured images for the plurality of frames for each of the A buffer 3c and the B buffer 3d and compare the marks M.

Second Embodiment

A second embodiment of the present invention is described below with reference to FIG. 8 and FIG. 9.

In the first embodiment described above, the control section 1 recognizes the marks M added to left and right pages in the opened read target medium 13, and judges whether the current state is the page-turning state based on the result of the recognition of the marks M. In the second embodiment, the control section 1 recognizes the written state of a character, a graph, or the like written in left and right pages in the opened read target medium 13, compares written states between the current captured image and the previous captured image, and judges whether page-turning is being performed based on the comparison result (a write change state).

Note that Sections that are basically the same or have the same name in both embodiments are given the same reference numerals, and therefore explanations thereof are omitted. Hereafter, the characteristic sections of the second embodiment will mainly be described.

Figure 8:
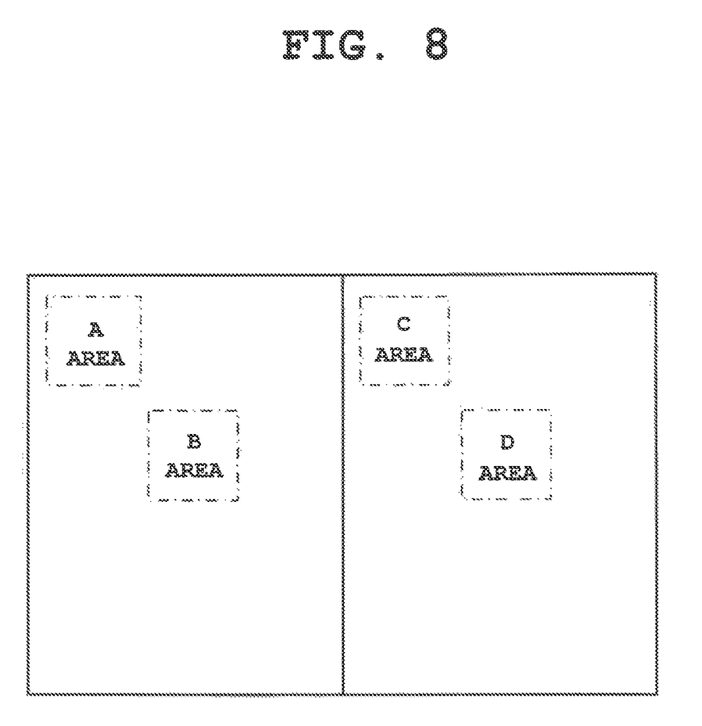
FIG. 8 is a diagram for describing a feature of a second embodiment.

FIG. 8 is a diagram for describing a feature of the second embodiment.

In the second embodiment, when the imaging section 6 images left and right pages in the opened read target medium 13, the control section 1 recognizes the written state of a character, a graph, or the like written in the notebook by analyzing the captured image. For example, the control section 1 recognizes the outline shape of a written portion, that is, an outline shape according to the size of a character group in a column direction or a row direction or the size of a graph in a column direction or a row direction. However, the control section 1 does not recognize the entire pages, but recognizes only a part of areas with a high possibility of writing.

In an example depicted in the drawing, an area at an upper left corner (A AREA) and an area at an upper left of the center (B AREA) are set on the left page as areas with high possibility of writing and, similarly, an area at an upper left corner (C AREA) and an area at an upper left of the center (D AREA) are set on the right page as areas with high possibility of writing.

These areas are areas fixedly determined in advance by the manufacturer side or the like. As such, with the A to D areas being set as a plurality of areas on the left and right pages in the opened state, the control section 1 analyzes the current captured image, recognizes the written state of each of the A to D areas (the outline shape of the written portion), compares it with the written state of each of the A to D areas of the previous captured image, and thereby judges whether the written states between the relevant areas match each other. Then, the control section 1 counts the number of matched areas, and judges whether page-turning is being performed based on whether the number of areas is equal to or larger than a predetermined value (for example, 3, that is, three areas out of four areas).

Figure 9:
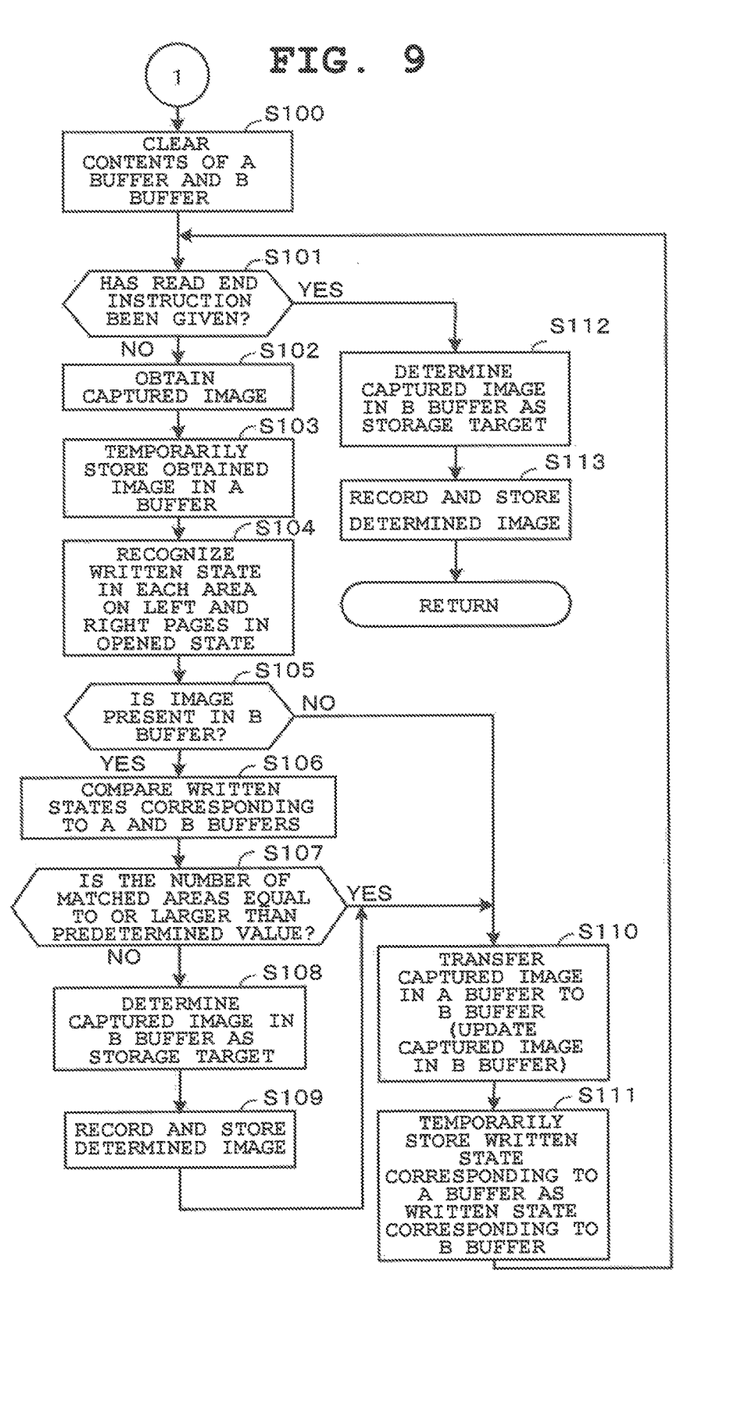
FIG. 9 is a flowchart of an operation following the flow of FIG. 5 in the second embodiment.

FIG. 9 is a flowchart of an operation following the flow of FIG. 5, which replaces FIG. 6 of the first embodiment. Portions basically similar to those of FIG. 6 are briefly described.

First, as with the first embodiment, the control section 1 performs initialization processing for clearing the A buffer 3c and the B buffer 3d (Step S100). If a read end operation has not been performed (NO at Step S101), the control section 1 obtains a captured image for one frame from the imaging section 6 (Step S102), and temporarily stores the obtained image in the A buffer 3c as a current captured image (Step S103).

Then, by analyzing the current captured image, the control section 1 performs processing for recognizing the written state (the outline shape of the written portion) of each of the A to D areas on the left and right pages in the opened state (Step S104), and then judges whether a captured image has been temporarily stored in the B buffer 3d (Step S105).

Here, immediately after the initialization processing, the contents of the B buffer 3d have been cleared (NO at Step S105), and therefore the control section 1 proceeds to the next Step S110. At Step S110, the control section 1 performs processing for updating the contents of the B buffer 3d by transferring the captured image in the A buffer 3c to the B buffer 3d.

Then, to take the written state of each area recognized by analyzing the current captured image as the written state of each area for the previous captured image, the control section 1 performs processing for temporarily storing the written state corresponding to the A buffer 3c as a written state corresponding to the B buffer 3d (Step S111).

Next, the control section 1 returns to Step S101. At Step S101, until a read end instruction is given, the control section 1 obtains a captured image for one frame from the imaging section 6 (Step S102), temporarily stores the obtained image in the A buffer 3c as a current captured image (Step S103), and performs processing for analyzing the current captured image and recognizing the written state of each of the A to D areas (Step S104).

Here, since a captured image has been temporarily stored in the B buffer 3d (YES at Step S105), the control section 1 proceeds to the next Step S106, and compares the written state corresponding to the A buffer 3c and the written state corresponding to the B buffer 3d with each other for each area.

Then, the control section 1 judges whether the written states between the corresponding areas match each other (substantially match each other, for example, match 90% or higher) for each area, counts the number of matched areas, and judges whether page-turning is being performed based on whether the number or areas is equal to or higher than a predetermined value (for example, "3") (Step S107).

As a result, if the number of matched areas is equal to or larger than 3, which is the predetermined number (YES at Step S107), or in other words, if at least the contents of three areas out of four areas have not been changed, the control section 1 judges that page-turning is not being performed, and proceeds to the next Step S110 to perform processing for updating the contents of the B buffer 3d by transferring the captured image in the A buffer 3c to the B buffer 3d. In addition, the control section 1 performs processing for temporarily storing the written state corresponding to the A buffer 3c as a written state corresponding to the B buffer 3d (Step S111).

At Step S107, if the number of matched areas is smaller than 3 (NO at Step S107) and a change has occurred in at least two areas out of four areas, the control section 1 judges that page-turning is being performed. Accordingly, the control section 1 proceeds to Step S108, and determines the image in the B buffer 3d (the previous captured image) as a storage target. Subsequently, the control section 1 records and stores the determined image in the SD card of the storage section 3 (Step S109).

Next, the control section 1 performs processing for updating the contents of the B buffer 3d by transferring the captured image in the A buffer 3c to the B buffer 3d (Step S110), and processing for temporarily storing the written state corresponding to the A buffer 3c as a written state corresponding to the B buffer 3d (Step S111). The control section 1 then returns to Step S101.

Hereafter, the control section 1 repeats the operation described above. When an operation to instruct the end of the image reading function (notebook reading function) is performed (YES at Step S101), the control section 1 determines the image in the B buffer 3d (the previous captured image) as a storage target (Step S112), and records and stores the determined image in the SD card of the storage section 3 (Step S113). Then, the control section 1 exits the flow of FIG. 9.

As described above, in the second embodiment, the control section 1 compares written states between the current captured image and the previous captured image, and judges whether page-turning is being performed based on a result of the comparison (a write change state). Therefore, page-turning can be easily and reliably detected from the written state (the write change state) of a character, a graph, or the like written in the notebook.

Also, when analyzing the current captured image and the previous captured image, the control section 1 compares the contents of a plurality of areas in each captured image with each other, and thereby judges whether page-turning is being performed based on the number of areas where the image has been changed from among the plurality of areas. As a result of this configuration, left and right pages in the opened state are not entirely recognized and only part of the areas with high possibility of writing is recognized, whereby recognition efficiency is improved.

Moreover, in the second embodiment, as the plurality of areas on left and right pages in the opened state, the A area to the D area determined in advance by the manufacturer side are fixedly set. However, the number of areas and the size of each area are not limited to this, and an area freely set by a user operation can be used.

Furthermore, each area may be dynamically set depending on the degree of writing (writing amount) in the notebook.

In each of the above-described embodiments, the present invention is applied to the tablet terminal device 11 as an image reading apparatus. However, the present invention is not limited thereto. The present invention may be applied to an imaging-function-equipped personal computer, PDA (Personal Digital Assistant), digital camera, music player, portable telephone, or the like, or, as a matter of course, may be a digital camera itself.

Still further, the "devices" or the "sections" described in the above-described embodiment are not required to be in a single housing and may be separated into a plurality of housings by function. In addition, the steps in the above-described flowcharts are not required to be processed in time-series, and may be processed in parallel, or individually and independently.

While the present invention has been described with reference to the preferred embodiments, it is intended that the invention be not limited by any of the details of the description therein but includes all the embodiments which fall within the scope of the appended claims.

What is claimed is:

1. An image reading apparatus comprising:
   a first judging section which, each time a newly captured image is obtained by imaging, judges whether the newly captured image is a captured image obtained on a way of page-turning from a departure position of a page of a book to a destination position of the page;
   a temporary storage section which temporarily stores the newly captured image as a previous captured image when the first judging section judges that the newly captured image is not a captured image obtained on a way of page-turning from a departure position of a page of the book to a destination position of the page;
   a second judging section which, prior to temporarily storing the newly captured image as a previous captured image, judges whether, based on a latest captured image temporarily stored as a previous captured image so far by the temporary storage section and the newly captured image to be temporarily stored by the temporary storage section, the latest captured image and the newly captured image area captured image of same pages in an opened state; and
   a determining section which determines the latest captured image as a storage target when the second judging section judges that the latest captured image and the newly captured image are not a captured image of same pages in an opened state.

2. The image reading apparatus according to claim 1, further comprising:
   an imaging section which images from a side where the book is opened such that the book in the opened state is included in a viewing angle,
   wherein the first judging section, based on a captured image obtained by imaging by the imaging section, judges whether the captured image is a captured image obtained on a way of page-turning from a departure position of a page of the book to a destination position of the page.

3. The image reading apparatus according to claim 1, wherein the first judging section, based on predetermined marks added to respective pages of the book, judges whether the captured image is a captured image obtained on a way of page-turning from a departure position of a page of the book to a destination position of the page.

4. The image reading apparatus according to claim 1, wherein the imaging section images a book where marks equal to each other are added on both pages in the opened state and where different marks are added between front and back of a page.

5. An image reading method comprising:
   an imaging step of imaging a book where marks equal to each other are added on both pages in an opened state and where different marks are added between front and back of a page, from a side where the book is opened such that the book in the opened state is included in a viewing angle;
   a first judging step of, each time a newly captured image is obtained by imaging by the imaging step, judging whether the newly captured image is a captured image obtained on away of page-turning from a departure position of a page of the book to a destination position of the page;
   a temporary storage step of temporarily storing, in a temporary storage section, the newly captured image as a previous captured image when the first judging step judges that the newly captured image is not a captured image obtained on a way of page-turning from a departure position of the page of the book to a destination position of the page;
   a second judging step of, prior to temporarily storing the newly captured image as a previous captured image, judging whether, based on a latest captured image temporarily stored as a previous captured image so far by the temporary storage section and the newly captured image to be temporarily stored by the temporary storage section, the latest captured image and the newly captured image are a captured image of same pages in an opened state; and
   a determining step of determining the latest captured image as a storage target when the second judging step judges that the latest captured image and the newly captured image are not a captured image of same pages in an opened state.

6. A non-transitory computer-readable storage medium having stored thereon a program that is executable by a computer of an image reading apparatus, the program being executable by the computer to perform functions comprising:
   first judging processing for, each time a newly captured image is obtained by imaging, judging whether the newly captured image is a captured image obtained on a way of page-turning from a departure position of a page of a book to a destination position of the page;
   temporary storage processing for temporarily storing, in a temporary storage section, the newly captured image as a previous captured image when the first judging processing judges that the newly captured image is not a captured image obtained on a way of page-turning from a departure position of the page of the book to a destination position of the page;
   second judging processing for, prior to temporarily storing the newly captured image as a previous captured image, judging whether, based on a latest captured image temporarily stored as a previous captured image so far by the temporary storage section and the newly captured image to be temporarily stored by the temporary storage section, the latest captured image and the newly captured image are a captured image of same pages in an opened state; and
   a determining processing for determining the latest captured image as a storage target when the second judging processing judges that the latest captured image and the newly captured image are not a captured image of same pages in an opened state.

\* \* \* \* \*

UNITED STATES PATENT AND TRADEMARK OFFICE
CERTIFICATE OF CORRECTION

PATENT NO. : 9,729,737 B2
APPLICATION NO. : 15/146280
DATED : August 8, 2017
INVENTOR(S) : Kazuyasu Yamane et al.

Page 1 of 1

It is certified that error appears in the above-identified patent and that said Letters Patent is hereby corrected as shown below:

In the Claims

Column 14, Line 53, delete "area" and insert --are a--.

Column 15, Line 25, delete "away" and insert --a way--.

Signed and Sealed this
Tenth Day of October, 2017

Joseph Matal
*Performing the Functions and Duties of the*
*Under Secretary of Commerce for Intellectual Property and*
*Director of the United States Patent and Trademark Office*